(12) United States Patent
Sullivan

(10) Patent No.: US 8,955,793 B2
(45) Date of Patent: *Feb. 17, 2015

(54) LANDING GEAR METHOD AND APPARATUS FOR BRAKING AND MANEUVERING

(76) Inventor: Steven Sullivan, Ashburn, VA (US)

( * ) Notice: Subject to any disclaimer, the term of this patent is extended or adjusted under 35 U.S.C. 154(b) by 1424 days.

This patent is subject to a terminal disclaimer.

(21) Appl. No.: 11/748,154

(22) Filed: May 14, 2007

(65) Prior Publication Data

US 2010/0006699 A1      Jan. 14, 2010

Related U.S. Application Data

(60) Division of application No. 11/011,756, filed on Dec. 15, 2004, now Pat. No. 7,226,018, which is a continuation-in-part of application No. 10/734,216, filed on Dec. 15, 2003, now Pat. No. 7,237,748.

(51) Int. Cl.
  *B64C 25/40*    (2006.01)
  *B64C 25/42*    (2006.01)
  *B60L 7/26*     (2006.01)

(52) U.S. Cl.
  CPC ............... *B64C 25/405* (2013.01); *B60L 7/26* (2013.01); *B64C 25/42* (2013.01); *B60L 2220/44* (2013.01); *B60L 2240/30* (2013.01); *B60L 2250/24* (2013.01); *Y02T 50/823* (2013.01)
  USPC ............................................ 244/50; 244/111

(58) Field of Classification Search
  CPC ..................... B64C 25/405; B64F 2700/6238
  USPC ........... 244/103 S, 110 R, 111, 110 A, 50, 51
  See application file for complete search history.

(56) References Cited

U.S. PATENT DOCUMENTS

| 2,564,320 | A | 8/1951 | Brainard |
| 3,017,145 | A | 9/1958 | Yarber |

(Continued)

FOREIGN PATENT DOCUMENTS

| DE | 1273335 | 7/1968 |
| EP | 0611675 A1 | 8/1994 |

(Continued)

OTHER PUBLICATIONS http://www.wisegeek.com/what-is-carbon-nanofoam.htm.*

(Continued)

*Primary Examiner* — Brian M O'Hara
(74) *Attorney, Agent, or Firm* — Symbus Law Group, LLC; Clifford D. Hyra

(57) ABSTRACT

Aircraft landing gear comprised of a wheel hub motor/generator includes alternating rotors and stators mounted with respect to the wheel support and wheel. The invention in certain embodiments can provide motive force to the wheel when electrical power is applied, e.g. prior to touch-down, thus decreasing the difference in relative velocities of the tire radial velocity with that of the relative velocity of the runway and reducing the sliding friction wear of the tire. After touchdown the wheel hub motor/generator may be used as a generator thus applying a regenerative braking force and/or a motorized braking action to the wheel. The energy generated upon landing may be dissipated through a resistor and/or stored for later use in providing a source for motive power to the aircraft wheels for taxiing and ground maneuvers of the aircraft. Methods and apparatuses for nose gear steering and ABS braking using the disclosed invention are described.

57 Claims, 3 Drawing Sheets

(56) References Cited

U.S. PATENT DOCUMENTS

| | | | |
|---|---|---|---|
| 2,914,359 A | | 11/1959 | Yarber |
| 3,292,021 A | * | 12/1966 | Hoag ............................ 310/10 |
| 3,482,806 A | * | 12/1969 | Trautzsch et al. ......... 244/103 R |
| 4,001,617 A | | 1/1977 | Boyer |
| 4,223,255 A | * | 9/1980 | Goldman et al. ........ 318/400.41 |
| 4,567,391 A | | 1/1986 | Tucker et al. |
| 4,585,085 A | | 4/1986 | Handel et al. |
| 4,659,040 A | | 4/1987 | Sinclair |
| 4,687,158 A | * | 8/1987 | Kettering ......................... 244/63 |
| 5,207,304 A | * | 5/1993 | Lechner et al. ................. 191/10 |
| 5,669,470 A | * | 9/1997 | Ross ............................... 191/10 |
| 5,721,473 A | * | 2/1998 | DeVries ......................... 318/139 |
| 6,037,726 A | | 3/2000 | Tabata et al. |
| 6,046,518 A | | 4/2000 | Williams |
| 6,064,135 A | | 5/2000 | Hahn |
| 6,177,773 B1 | | 1/2001 | Nakano et al. |
| 6,223,106 B1 | | 4/2001 | Yano et al. |
| 6,318,487 B2 | | 11/2001 | Yanase et al. |
| 6,323,573 B1 | | 11/2001 | Pinkerton |
| 6,362,750 B1 | | 3/2002 | Castor |
| 6,450,448 B1 | | 9/2002 | Suzuki |
| 6,617,748 B2 | | 9/2003 | Dunn |
| 6,633,106 B1 | | 10/2003 | Swett |
| 2002/0171324 A1 | | 11/2002 | Smith et al. |
| 2003/0159866 A1 | | 8/2003 | Claypole et al. |
| 2005/0109568 A1 | * | 5/2005 | Ether ............................ 188/156 |

FOREIGN PATENT DOCUMENTS

| | | |
|---|---|---|
| EP | 0875430 A2 | 4/1998 |
| EP | 0921621 A2 | 6/1999 |
| GB | 902155 | 7/1962 |
| GB | 1213862 | 11/1970 |
| JP | S62-265023 A | 11/1987 |
| JP | H03-295796 A | 12/1991 |
| JP | WO 93/23266 | 11/1993 |
| JP | H08-289501 A | 11/1996 |
| JP | H09-182329 A | 7/1997 |
| JP | 2003-182399 A | 7/2003 |
| RU | 2023630 C1 | 11/1994 |
| RU | 2213408 C2 | 9/2003 |
| WO | 95/29094 A1 | 11/1995 |
| WO | 96/09679 A2 | 3/1996 |
| WO | 96/38903 A1 | 12/1996 |
| WO | 00/76054 A1 | 12/2000 |
| WO | 03/047070 A1 | 6/2003 |
| WO | 03/085806 A1 | 10/2003 |

OTHER PUBLICATIONS

Examination report from E.P.O. that issued with respect to patent family member European Patent Application No. 04821791, mail date is Jan. 26, 2011.

Examination report from E.P.O. that issued with respect to patent family member European Patent Application No. 04821791, mail date is Sep. 16, 2008.

International Preliminary Report on Patentability from USPTO via WIPO with respect to patent family member PCT/US2004/041843, mail date May 4, 2006.

Response filed with E.P.O. to examination report of Jan. 26, 2011 for patent family member European Patent Application No. 04821791 on Jun. 3, 2011.

Response filed with E.P.O. to examination report of Sep. 16, 2008 for patent family member European Patent Application No. 04821791 on Mar. 26, 2009.

Office Action from J.P.O. that issued with respect to patent family member Japanese Patent Application No. 2006-545805, mail date is Oct. 4, 2011.

Office Action from J.P.O. that issued with respect to patent family member Japanese Patent Application No. 2006-545805, mail date is Oct. 5, 2010.

Response filed with J.P.O. to Office Action of Oct. 5, 2010 for patent family member Japanese Patent Application No. 2006-545805 on Mar. 14, 2011.

Office Action from CIPO that issued with respect to patent family member Canadian Patent Application No. 2,549,445, mail date is Dec. 15, 2009.

Notice of Allowance from CIPO in response to Response of Jun. 15, 2010 that issued with respect to patent family member Canadian Patent Application No. 2,549,445, mail date is Sep. 22, 2010.

Response filed with CIPO to Office Action of Dec. 15, 2009 for patent family member Canadian Patent Application No. 2,549,445 on Jun. 15, 2010.

Official Notice from ROSPATENT that issued with respect to patent family member Russian Patent Application No. 2006125414/11, mail date is Jul. 3, 2009.

Official Notice from ROSPATENT that issued with respect to patent family member Russian Patent Application No. 2006125414/11, mail date is Nov. 13, 2009.

Response filed with ROSPATENT in response to Official Notice of Nov. 13, 2009 for patent family member Russian Patent Application No. 2006125414/11, mail date is Apr. 7, 2010.

Response filed with ROSPATENT in response to Official Notice of Jul. 3, 2009 for patent family member Russian Patent Application No. 2006125414/11, mail date is Sep. 21, 2009.

Official Notice from ROSPATENT that issued with respect to patent family member Russian Patent Application No. 2006125414/11, mail date is Dec. 24, 2008.

Decision on Grant from ROSPATENT that issued with respect to patent family member Russian Patent Application No. 2006125414/11, mail date is Apr. 7, 2010.

Office Action from USPTO that issued with respect to patent family member U.S. Appl. No. 11/924,563, mail date is Sep. 29, 2009.

Response filed with USPTO in response to Office Action of Sep. 29, 2009 for patent family member U.S. Appl. No. 11/924,563, mail date is Dec. 26, 2009.

Office Action from USPTO that issued with respect to patent family member U.S. Appl. No. 11/924,563, mail date is Oct. 27, 2010.

Response filed with USPTO in response to Office Action of Oct. 27, 2010 for patent family member U.S. Appl. No. 11/924,563, mail date is Feb. 22, 2011.

Response filed with USPTO in response to Notice of Nonresponsive Amendment of Mar. 16, 2010 for patent family member U.S. Appl. No. 11/924,563, mail date is Apr. 16, 2010.

Office Action from USPTO that issued with respect to patent family member U.S. Appl. No. 11/924,563, mail date is May 13, 2011.

Examination report from E.P.O. that issued with respect to patent family member European Patent Application No. 04821791, mail date is Nov. 5, 2012.

Japanese Office Action with translation dated Jan. 14, 2014.

* cited by examiner

LANDING GEAR METHOD AND APPARATUS FOR BRAKING AND MANEUVERING

This application is a divisional of U.S. patent application Ser. No. 11/011,756 filed Dec. 15, 2004 now U.S. Pat. No. 7,226,018, which is a continuation-in-part of U.S. patent application Ser. No. 10/734,216 filed Dec. 15, 2003 now U.S. Pat. No. 7,237,748, the entire disclosures of which are incorporated herein by reference.

BACKGROUND OF THE INVENTION

1. Field of the Invention

The Invention relates to aircraft landing gear and, more specifically to an integrated wheel hub motor/generator, regenerative braking and/or motorized braking method for an aircraft landing gear system, which reduces wear of the braking system and the associated tires while improving stability of said aircraft and reducing the need for maintenance due to wear.

2. Related Art

It is known in the field of aircraft wheel and brake assemblies to provide a non-rotatable wheel support, a wheel mounted to the wheel support for rotation, and a brake disk stack using friction braking to convert rotary motion of said disks into friction heat energy which creates wear of said disks. Various brake actuation configurations and methods are known, as in U.S. Pat. Nos. 4,381,049, 4,432,440, 4,542,809, 4,567,967, 4,596,316, 4,865,162 and 6,615,958.

The current state of the art for providing braking systems for aircraft uses stators and rotors, which are forced into physical contact with each other thus generating friction heat that introduces wear of the associated disks and requires periodic maintenance to replace the worn parts.

The primary drawback of carbon disk brakes of the latest designs is that a greater volume of carbon material is needed to absorb the same amount of heat energy as that of steel disk brakes. Another drawback of carbon disk brakes is the diminished braking capacity due to moisture contamination of the carbon surfaces due to rain and the high replacement cost after they are worn.

Furthermore, aircraft are required to maneuver within the defined taxies, runways and terminals. One such requirement is the 180-degree turn that places an upper limit on the aircraft allowed for a particular runway based upon the width of the runway and the ability of said aircraft in conducting a 180-degree turn thereon within the physical width of said runway. Current landing gear provides limited abilities to perform such 180-degree turns.

One significant concern in aircraft brake design is the dissipation of kinetic energy of aircraft within the braking system of the landing gear system during landing and rejected takeoff conditions. Ultimately, it is the rolling friction present between the tires and the landing surface, which slows the aircraft, thus brake capacity requirements are based upon maximum landing weight of the aircraft and the rolling friction. Braking systems of the prior art are relatively inflexible with respect to the manner in which they generate the required braking force.

OBJECTS OF THE INVENTION

Accordingly, it is an object of the invention to provide an improved system and method for braking and maneuvering in landing gear of aircraft.

It is a further object of the invention to overcome the limitations and drawbacks associated with prior art systems for braking and maneuvering in landing gear of aircraft.

A further object of the invention is to reduce wear of the components involved in the landing gear and braking system, add stability to the aircraft structure, and increase reliability, while reducing the needed maintenance associated with current friction braking systems.

It is a further object of the invention to reduce the need for friction brake disks within the landing gear of aircraft.

It is yet a further object of the invention to provide a system and method for recovering kinetic energy from aircraft and convert such energy into electrical power.

It is a still further object of the invention to provide a system and method for aircraft landing gear, which permits a reduced turn radius for the aircraft.

Another objective is to reduce the wear of the tires of said aircraft due to sliding friction wear due to touchdown by closely matching the landing gear tires' radial velocity with that of the relative ground velocity such that when touchdown occurs the difference in velocity is greatly minimized, thus greatly reducing the sliding friction wear of said tires associated with the touchdown of the landing gear tires with the runway landing surface. This sliding friction, which is present in the current state of the art, creates an associated wear that affects tire performance thus affecting safety.

A further object is to provide a means of motive force for the purpose of conducting taxiing and ground maneuvers of said aircraft, which contributes to increased efficiency, maneuverability, stability and safety of said aircraft.

A further object is to provide a means of motive force for the purpose of assisting in takeoff, which reduces the required takeoff distance for the aircraft, which also contributes to increased efficiency, maneuverability, stability and safety of said aircraft.

SUMMARY OF THE INVENTION

The present invention provides a unique means of aircraft braking wherein the use of regenerative braking and/or motorized braking is applied in a manner, which creates advantages over prior art friction braking systems. This is accomplished by integrating a wheel hub motor/generator within the wheel and axle structures wherein the braking action is provided for by the magnetic torque interactions of the stator and rotor disk sections of said wheel hub motor/generator. Kinetic energy of said aircraft is converted into electrical power, which may be dissipated through a resistor and/or stored for later use when the aircraft is taking off, taxiing and performing other ground maneuvers, or may be used at the time of landing to increase the effectiveness of the electromagnetic braking system by instituting the use of motorized braking action, thus increasing the overall efficiency of the braking system and adding stability and safety to said aircraft.

Moreover, it has been discovered that other features present have applications to reduce landing gear tire wear of aircraft by using the wheel hub motor/generator as a motor prior to landing to match the tire radial velocity with that of the relative ground velocity such that when touchdown occurs that there is minimal difference in the two velocities such that sliding friction wear is greatly minimized thus improving life time of landing gear tires thus increasing the performance of said landing gear tires, which adds to the controllability and safety of said aircraft. There is an added benefit in that when the landing gear wheels are motorized in flight they provide a gyroscopic stabilizing effect, which dramatically stabilizes the aircraft depending upon the speed of rotation of, said landing gear wheels.

In one embodiment, a wheel hub motor/generator disks stack includes alternating rotor and stator disks wherein each rotor disk is coupled to the wheel for rotation and each stator disk is coupled to the axle and/or torque tube for support that is static in relation to the tire rotation. In a preferred embodiment the wheel hub motor/generator functions as a brake by means of generator action also known as regenerative braking wherein magnetic torque interactions between the rotor disk and stator disk sections apply a braking force to the wheel and tire assembly and the electrical power generated is stored for later use.

The wheel hub motor/generator may have mounted thereon a plurality of associated stator and rotor disk members which may be activated or deactivated individually, sequentially or in unison with the application of an electrical current or generation of electrical current in varying directions depending upon the need for motor and/or regenerative and/or motorized braking action. In one such case electromagnetic braking is applied by using associated rotor and stator disks as a generator and from which the output power from the stator is applied to another stator disk in such a manner as to increase the braking effect of the associated rotor of said other stator disk, thus accomplishing motorized braking action or motoring of a disk or disks which is acting as a generator within the same, or other wheel hub motor/generator, disk stack as that of the generating disk or disks.

The method of motor/generator electrical interconnections of different stator disk or disks within the same, or other wheel hub motor/generator, disk stack or motorized braking method as disclosed herein can be varied in numerous combinations of generator disk or disks and motor disk or disks within the present invention and is unique in the area of disk type axial flux motor/generators and offers flexibility in aircraft applications by allowing for the electrical and/or physical addition of disk or disks or removal of disk or disks based upon the aircraft landing weight and/or landing gear design needs. This electrical interconnection of disks in which any disk within the wheel hub motor/generator disk stack may act as a motor or as a generator or in any combination thereof is known as motorized braking method as proposed within the present invention, which adds flexibility to the design of aircraft landing gear. Incorporating the use of disk type axial flux motor/generators greatly reduces design cost due to this flexibility in motoring and braking of said motor/generator.

As noted above, one concern in aircraft brake design is the dissipation of kinetic energy of aircraft within the braking system of the landing gear system during landing and rejected takeoff conditions; ultimately, it is the rolling friction present between the tires and the landing surface which slows the aircraft, and thus brake capacity requirements are based upon maximum landing weight of the aircraft and the rolling friction. The method of motorized braking in accordance with the invention introduces flexibility in generating the required braking force that is lacking in the present state of the art braking systems, and allows for more efficient designs in that an overloaded aircraft can increase the amount of braking capacity by means of altering the electrical connections through switching controls thus increasing the safety of the aircraft.

Furthermore, by implementing the use of disk type axial flux wheel hub motor/generators within the landing gear said aircraft is able to reduce the turn radius in which a 180-degree turn may be accomplished by means of motoring one set of landing gear in one direction and motoring the other set of landing gear in the opposite direction, this method of turning thus allows said aircraft to complete a 180-degree turn within a smaller turning radius as opposed to that of the current state of the art landing gear, due to the fact that the center of rotation of the present invention is located between the main landing gear on the center line of said aircraft and not at the intersection of the lines extending from the axes of the nose gear and landing gear as with current state of the art landing gear. This feature provides for reduced runway surface wear due to the lack of need to lock up the brakes on the pivoting landing gear assembly and eliminates the associated wear of the tires of the pivoting landing gear assembly due to the sliding friction, which is present in the current state of the art.

BRIEF DESCRIPTION OF THE DRAWINGS

The invention is explained in greater detail below with reference to an exemplary embodiment that is illustrated in the accompanying figures.

DESCRIPTION OF THE PREFERRED EMBODIMENT

Figure 1:
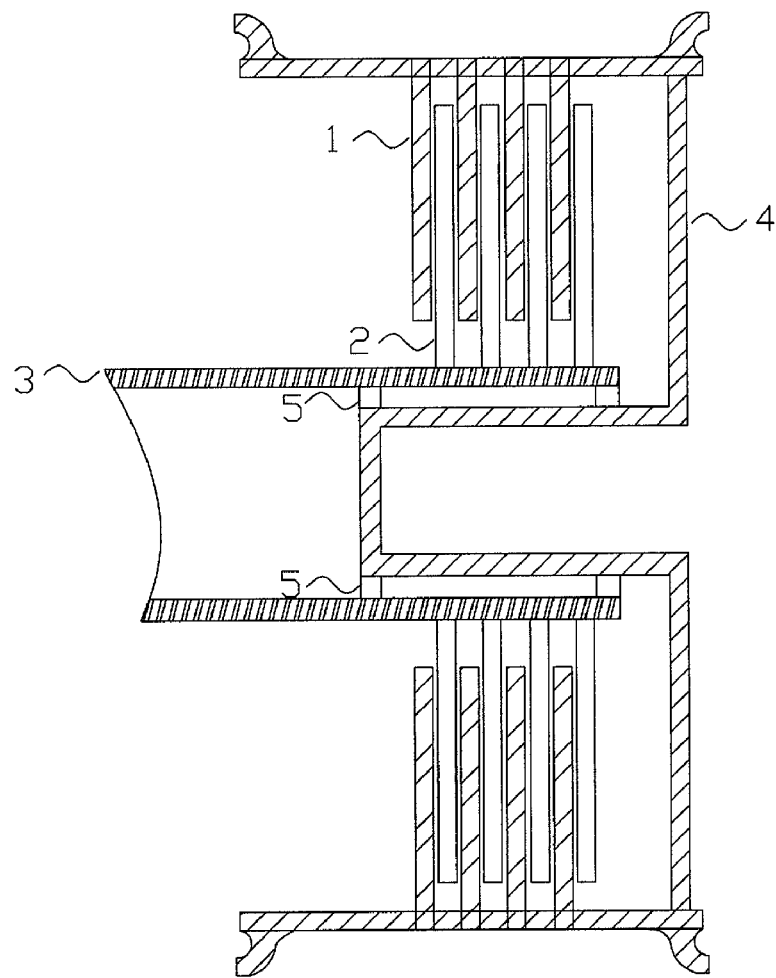
FIG. 1 is a cross sectional view of an embodiment of a disk type axial flux wheel hub motor/generator in accordance with the invention.

FIG. 1. Shows the cross sectional view of a possible disk stack axial flux type wheel hub motor/generator used to accomplish the needed electromagnetic braking and/or motoring of the landing gear wheels. The rotors 1 are coupled to the wheel 4 and rotate with the wheel 4. The stator disks 2, which may be constructed of an electrically conductive material, are coupled to the shaft 3 and/or central torque tube, and are stationary with respect to the wheel in which said disks are electrically isolated from each other except through available electrical connections (not shown). The rotor disks 1, which may be constructed of an electrically conductive material or may be constructed of permanent magnets, are coupled to the wheel 4. The wheel 4 is supported by means of a bearing set 5, which may be comprised of inboard and outboard bearing sets or a sleeve, air, or magnetic type bearing.

In the preferred embodiment, prior to touchdown the wheel 4 is motorized by applying power with a radial flow of electrical current through the stator disk 2 which generates an axial magnetic flux field which interacts with the axial magnetic flux field of the rotor disk 1 permanent magnets which are of a high energy density such as neodymium which are substantially located within the rotor disk 1 with an axial flux orientation in which all said permanent magnets are in the same vector direction. This embodiment develops a magnetic torque between the rotor disk 1 and stator disk 2, which causes the wheel 4 to experience a motor action. The stator disk 2 and/or rotor disk 1 may be comprised of aluminum, which may be coated with copper, which may be further coated with silver and/or may be comprised of any other alloy combination such as beryllium, copper and/or conductive polymer for increased strength. The electrical connections required are not shown, as the provision of electrical connections is well known. Such electrical connection may include, e.g., rolling contacts and/or sliding carbon brushes. Alternatively, a brushless design may be used in order to accomplish the motor/generator action due to axial magnetic flux interactions described herein.

Figure 2:
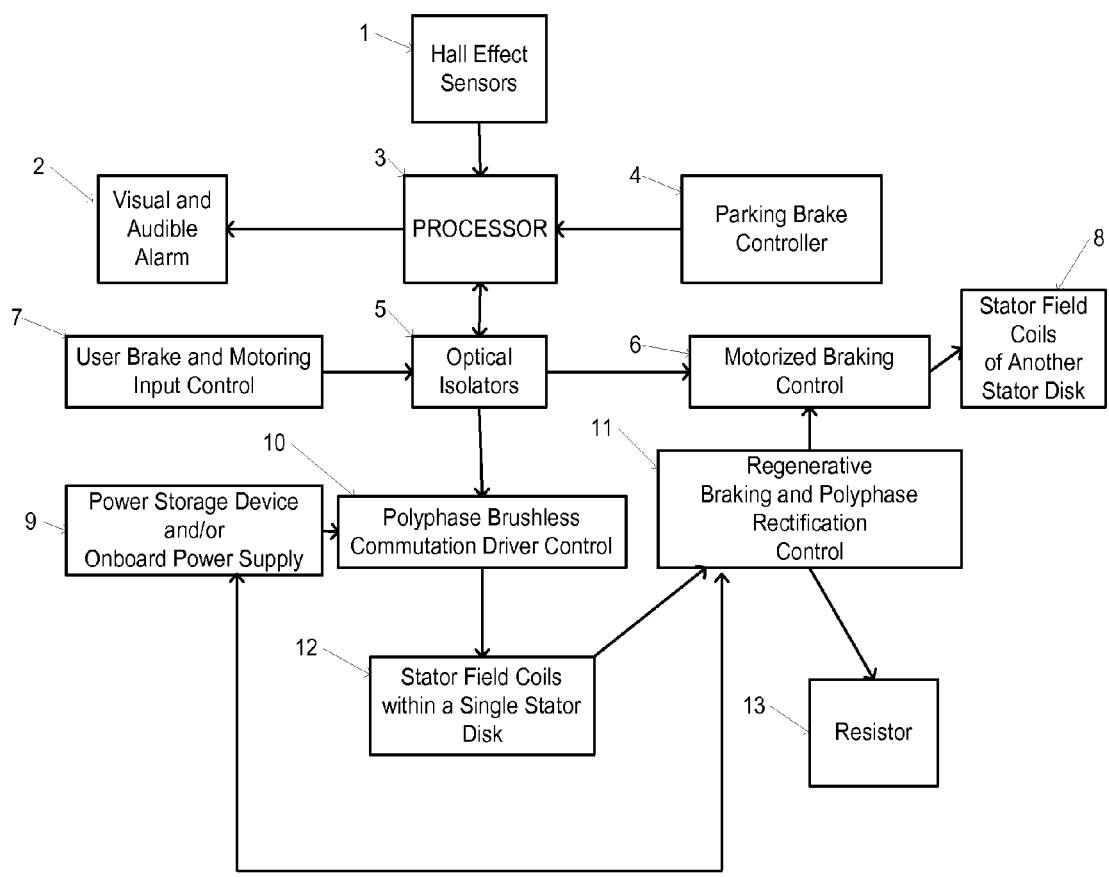
FIG. 2 is a flow chart representing one possible implementation of switching controls used to implement the landing gear method in accordance with the invention.

FIG. 2 shows the flow of the switching controls system signals and power signals used to accomplish the needed signals to control motoring and/or braking of the aircraft landing gear wheel hub motor/generator within a brushless design.

In the case of providing motor action to the wheel hub motor/generator the Hall effect sensors 1 are used to indicate the position of the permanent magnets within the rotor disk wherein the magnets are alternating north and south poles with the flux aligned axially and aligned with associated stator field coils. The position information of the rotor disk is sent to the processor 3 for proper timing of control signals which are sent to the optical isolators 5 which are then sent to the polyphase brushless commutation driver control 10 which applies power from the power storage device and/or onboard power supply 9 to the stator field coils within a single stator disk 12 such that a motor action is produced either in the forward or reverse directions dependent upon the input from the user brake and motoring input control 7 which provides information to the processor 3 through the optical isolators 5 such as to initiate user input for forward or reverse motor action within the wheel hub motor/generator and the input from the parking brake controller 4 to the processor 3 is such that it indicates whether the parking brake system is engaged or not. An alarm 2 will activate if the parking brake is engaged and user input from the user brake and motoring input control 7 is initiating motor action. If the parking brake is disengaged the processor 3 will allow motor action in the forward or reverse direction as per the user input from the user brake and motoring input control 7.

In the case of providing generator action from the wheel hub motor/generator an electrical power connection is provided for from the stator field coils within a single stator disk 12 to the regenerative braking and polyphase rectification control 11 and as the relative motion occurs between the stator and rotor sections a polyphase power signal is generated within the wheel hub motor/generator stator coils and this power signal is sent to the regenerative braking and polyphase rectification control 11 which converts the varying polyphase power signal into a DC signal based upon control signals generated from the processor 3 which is dependent upon the input user control signals from the user brake and motoring input control 7. If the processor control signal is such that power storage and/or power dissipation is required then the DC power signal is sent from the regenerative braking and polyphase control 11 to the power storage device and/or onboard power supply 9 for later use and/or sent to a power dissipation resistor 13 for the dissipation of the generated electrical power. The regenerative braking and polyphase rectification control 11 may also be used to provide polyphase electrical power to the motorized braking control 6 which is controlled by processor 3 control signals in applying motorized braking commands as described within the preferred embodiment wherein polyphase power signals are applied to stator field coils of other stator disk 8 within the same or other wheel hub motor/generator disk stack such as to supply electrical power to stator field coils of other stator disk 8 which are experiencing generator action thus increasing the braking effect by motoring the disk in the opposite direction to that of the rotor rotational direction thus providing for a motorized braking effect which is unique in the area of brushless axial flux motors and generators.

Brushless axial flux motors and generators are well known in which the use of segmented rotor and stator sections are used. Variations of brushless axial flux motors and generators are taught within the following U.S. Pat. Nos. 4,223,255, 4,567,391 4,585,085, 6,046,518, 6,064,135 6,323,573 B1, 6,617,748 B2 and 6,633,106 B1 also within the following application publications US 2003/0159866 A1 and US 2002/0171324 A1. Any axial flux type motor/generator also known as disk or pancake motors may be used incorporating the method of motorized braking as described within the patent including those which have yet to be issued patents. The rotors or stators are generally composed of permanent magnet segments such that there exist alternating north and south poles with the flux aligned axially. The rotor or stator sections generally consists of stator or rotor coils within a single stator or rotor disk attached to the stator or rotor disk with hall effect sensors which are also attached to the stator or rotor disk, which is also segmented as such to align the coil sets with that of the permanent magnets used within the rotor or stator. The stator or rotor coils within a single disk require controlled application of currents to said coils from a polyphase brushless commutation driver control such as to cause motor action. The control signals applied to such polyphase brushless commutation driver controls are generated from a processor through optical isolation using position information provided for by the Hall effect sensors. Such brushless motors may also be used in regenerative braking to supply electrical current by means of generator action and the electrical current path is provided for by means of electrical switching controls wherein the electrical power generated is stored for later use via a control system.

The possible forms of axial flux motors and/or generators may be summarized as follows. Generally the windings may be either stationary or rotary in which the windings may be incorporated into the following structures. One such possible structure is a slotted laminated or composite iron core material with the windings located within slots. Another possible structure is a slotless structure in which the windings are wound into coils those are embedded within an ironless structure such as carbon or may be wound around a laminated or composite iron core material. A further possible structure is a solid structure in which induced currents circulate within a solid conducting material, which may or may not be a ferromagnetic material. Windings for a disk structure may be of printed circuit type and/or stamped from copper sheet and/or may be of copper windings wound into individual coils, which may or may not be of a litz wire construction.

Uses

The instant after touch down the wheel hub motor/generator which is used as a motor may be converted so as to be used as a generator by discontinuing the application of power to the stator disk and drawing power from said stator disk due to the generator action that takes place when the magnetic field of the rotor disk is in relative motion with that of the stator disk such relative motion is due to the kinetic energy of the aircraft and by using well-known electrical switching action and controls such as electronically controlled switches such as IGBT's or IGCT's and/or electromechanical type relays such that generated electrical power may be stored as in regenerative braking and/or dissipated as in dynamic braking and/or applied to other stator disk which increases the braking effect by means of motorized braking.

The generated electrical current from the stator disk may be stored on the airplane by means of battery, capacitor banks or other suitable electrical power storage devices such as a gyro and/or toroidal coil or coils that are electrically connected to the stator disk through the implementation of control electronics and/or physical contacts, thus allowing for dissipation and/or storage of electrical power generated for the purpose of supplying electrical power for later use.

Electromagnetic braking in its motorized braking method is preferably applied by using associated rotor and stator disk or disks as a generator whose output is applied to another stator disk or disks which then produces a motor action which is in direct opposition to the rotational direction of the wheel which generates a motorized braking action that exceeds that of regenerative braking alone, thus decreasing the braking distance and increasing the safety of the aircraft.

The method of motorized braking is preferably accomplished by two means. The first means is by the generated electrical power from one stator disk due to the relative motion of the associated rotor disk that may be applied to another stator disk within the wheel hub motor/generator disk stack in such a manner as to increase the braking effect by motoring the other associated rotor disk of said other stator disk in the opposite direction, thus accomplishing motorized braking or motoring of a disk or disks within the same or other wheel hub motor/generator disk stack as that of the generating disk or disks. The second means uses stored and/or onboard generated and/or external electrical power such that power is applied to the stator disk through provided electrical connections such that motor action is applied to the rotor disks in the opposite direction of rotation of the wheel thus accomplishing motorized braking or motoring of disk or disks within the wheel hub motor/generator. The two means above may be combined to produce the desired braking.

The axial flux wheel hub motor/generator may be used to provide for motor action to the aircraft landing gear wheels thus providing a gyroscopic stabilization effect to the aircraft. In a landing sequence the aircraft would deploy the landing gear and then apply a forward rotary motion to the aircraft landing gear wheels, which will stabilize the aircraft due to the gyroscopic effect thus increasing the stability and safety of the aircraft.

Another embodiment uses eddy current braking as opposed to electromagnetic braking wherein the rotor disk are constructed of aluminum, aluminum alloy, steel, copper, beryllium, silver or any combination thereof of various constructions and the stator disk may be constructed as described above in the electromagnetic case of the previous preferred embodiment wherein the braking is accomplished by applying electrical current to the stator disk such that the magnetic field of the stator disk induces eddy currents within said rotor disk such that there is developed a magnetic torque which generates a braking action upon the wheel of said aircraft.

Any combination of the above embodiments may be used in addition to that of friction braking systems currently used, thus increasing the life and aiding the usefulness of the friction braking system as well as reducing the associated maintenance cost by reducing the rate of wear and the number of friction disk required. Cooling systems used for friction braking systems may also be employed in the above embodiments and embodiment combinations if needed.

In the case of a landing event the pilot deploys the landing gear and the landing gear wheel hub motor/generator is applied power by the pilot input controls such as to cause a forward rotation of the landing gear tires. The rotational velocity of a landing gear tire for a 130-mile per hour landing event for a typical 747 aircraft would be approximately 48 rad/sec in order to match the tire and ground velocities thus greatly reducing the sliding friction wear of said tires. The instant after touchdown the control systems are used to store the generated electrical power from the wheel hub motor/generator thus providing regenerative braking. Then a few moments later the stored energy is applied to the wheel hub motors via the control system to cause motor action in the opposite direction than that of the rotational direction of the rotor thus providing for motorized braking. To cause the aircraft to come to a complete stop you could use motorized braking and disengage when forward motion has stopped and then apply Direct Current that would be applied to the stator disk such that each stator field coil would aid the magnetic flux present due to the permanent magnetic flux of the rotor which would also be used to apply a parking brake force to the landing gear wheels when parked at the terminal.

In the case of a takeoff event the pilot would initiate input controls such as to cause a forward rotation of the landing gear tires and power up the jet engines. This would cause the aircraft to travel down the runway faster than with the use of the jet engines alone thus reducing the needed runway distance for takeoff for a particular aircraft.

In the case of rejected takeoff all braking systems would engage in a manor such as to maximize the braking capacity of the aircraft.

In the case of the 180-degree turn ground maneuver the pilot would initiate input controls such as to cause one set of landing gear to be powered in the forward direction and the other set of landing gear to be powered in the opposite direction thus accomplishing the turning of said aircraft which is terminated under the control of the pilot.

In the case of aircraft carrier operations power supplied is from and external source of power via an attachment to the aircraft such as that used to propel or launch aircraft off an aircraft carrier. The means of electrical connection can be a direct physical contact connector or a non-contact type that employs the use of magnetic induction to transfer the energy from a ground track to the aircraft. In such an implementation in commercial aircraft ground tracks could be incorporated into the runways of an airport such as to allow for power transfer and/or provide for a means in which aircraft control personnel could directly control ground movements of aircraft by controlling the power supplied to the aircraft wheel hub motor/generator thus increasing the level of control for the aircraft control personnel.

Other embodiments are within the scope of the present invention. For example, the system may be very flexible in control such as allowing one stator-rotor disk set to be able to supply another stator-rotor disk set such as to accomplish motorized braking. The motorized braking may be accomplished by applying a rotational torque in the opposite direction as that of the rotational motion due to the landing event.

One possible use would be as follows: in a landing event the wheels would be spun up to landing speed and the instant after touchdown the power application would be removed and the wheels would act as generators. The system would store this energy and then a few moments later the stored energy may be applied to the stator-rotor sets such as to apply rotational torque in the opposite rotational direction thus accomplishing motorized braking. This may generate a nonlinear torque curve for the landing event which could be fully computer controlled so as to increase the effective level of braking.

As another example, the present invention need not utilize axial flux motors. Any electrical motor-generator device known in the art may be applied to the various landing gear assembly embodiments disclosed to achieve their corresponding benefits.

Besides the advantages listed, such as the ability to control the magnitude of braking depending on a voltage applied to the stator-rotor sets, the present invention includes other advantages. For example, where two or more wheels of a main landing gear may be rotated differentially and/or in opposite directions, the "turning radius" or width of runway needed by an aircraft to turn 180° decreases, thus making available smaller landing strips that otherwise would not be available to an aircraft. This in turn will allow aircrafts to take more direct travel paths, being able to rely on additional landing strips in case of emergency, thus reducing flight times and fuel consumption.

As another example of an advantage, taxiing by aircrafts, particularly jet aircrafts, is very inefficient because jet engine efficiencies increase with increased speed. Therefore, the ability of the stator-rotor sets to convert electrical energy (whether stored onboard in an electrical energy storage device or offboard and transferred via, e.g., induction) to rotational energy of the wheel may help to alleviate some of the inefficiencies of operating an aircraft's jet engines at low speeds. Further, not only may the electrically operated wheels be used in taxiing and takeoff assistance, but they may also reduce or eliminate the need for tow motors which are conventionally used to move aircrafts in manners otherwise difficult (e.g., in reverse).

As another example of an advantage, the ability of the system to spin up the landing gear wheels to a speed that approximately matches the aircraft's speed upon landing reduces the "jolt" or impulse that typically results when the stationary wheels of conventional aircraft quickly and violently speed up upon the aircraft's touchdown. Reducing or eliminating this jolt has the advantages of added passenger comfort, reduced tire and landing strip wear, and may also provide a stabilizing gyroscopic effect.

The motor action of the wheel hub motor/generator may be used as a source of motive power for the deployment or extension of the landing gear in preparation for a landing event or for retracting of the landing gear after take off, wherein the motor act is transmitted through a mechanical linkage to cause the positioning of and locking of the landing gear. Such a system may be implemented using a screw drive mechanism or other such mechanical means to provide for the transmission of movement from the wheel hub motor/generator to the movement of the landing gear struts or support assembly into a down and locked position in the case of a landing event and an up and secure position after a take off event.

Other considerations in application of the present invention include the following. First, the assembly may include both a nose gear and a main landing gear. The nose gear may have many or all of the same features as the main landing gear, such as one or more motor-generators (such as axial flux motor-generators), that may be controllable by a processor. Further, the nose gear may comprise two or more wheels that may be rotated differentially, depending on a steering signal from a user and processed by the processor.

Prior steering methods of aircraft are by either differential braking and/or turning the nose gear. Differential braking uses applied brakes to one side of the aircraft or the other as required to turn the aircraft along with an input from the pilot as to the nose gear direction by means of a hand wheel and/or rudder input. Differential braking causes severe ground or runway erosion and constant use can result in landing gear failure. Prior nose wheel steering angles are limited to plus or minus 60 degrees which is imposed by the available methods such as push-pull actuators, rack and pinion, rotary actuators, and multiplying linkage mechanical systems, which experience wear an require maintenance. Such mechanical actuators can cause movement of the nose gear while in flight if there is a failure of the self centering system.

Rotating two or more wheels of the nose gear differentially provides for turning of the nose gear only when the tries are in physical contact with the ground or runway which provides the required torque to steer the wheels without any forward motion of the aircraft. This steering may be accomplished by means of motoring one nose wheel hub motor/generator in one direction and motoring the other nose wheel hub motor/generator in the other direction thus allowing for positioning of the nose gear in any position desired by the pilot through the input of the handwheel. Alternatively, the respective nose wheel hub motor/generators may be turned in the same direction at different speeds.

This new steering method thus provides for an increase in maneuverability and a reduction in weight along with the added feature of increased reliability. When the aircraft is in motion and in contact with the ground both tires are rotating in the same direction and upon an input from the pilot from the handwheel one tire will be caused to rotate faster than the other tire thus providing for a differential in input power to the wheel hub motor/generators thus allowing for steering of the nose gear in any desired direction while moving. Prior methods used in nose gear of aircraft generate uneven wear of the nose gear tires during the landing event thus creating an imbalance in the nose gear tires. This imbalance of the nose gear tires can generate a shimmy on the nose gear wheels.

By incorporating the use of the method of tire wear reduction the performance of the nose gear steering system is increased due to the reduced shimmy which is due to the uneven wear of the nose gear tires upon a landing event thus providing for an increase in stability over current methods used.

Another consideration is that the nose gear, which is often used to help in steering, may be more capable of steering where it is forced strongly against the landing strip, particularly immediately after touchdown, so the system could include a fin or spoiler, or the equivalent, configured to direct air upward to help increase the force of the nose gear and front of the aircraft toward the landing strip.

In another aspect, the invention provides improved ABS braking. A significant advantage of an electromagnetic braking system is the fact that the feedback signal is a 1000 times faster that those within a hydraulic system thus allowing for an increase in effective braking capacity of an ABS thus increasing the level of safety and also contributes to an increased level of reliability as electromagnetic devices are inherently more reliable than hydraulic devices. The electromagnetic braking system is also inherently anti-locking.

There are several means of producing an Anti-lock Braking System (ABS) and any conventional ABS or improved ABS may be incorporated within the present invention so as to produce the desired braking of the aircraft. One such possible means will be described that implements the use of fuzzy logic as a possible control means.

In recent years fuzzy logic control techniques have been applied to a wide range of systems. Many electronic control systems in Anti-lock Brake Systems (ABS) are currently being pursued. These electronically controlled systems realize superior characteristics through the use of fuzzy logic based control rather than traditional control algorithms.

ABS is implemented to ensure optimal control and minimal stopping distances during hard or emergency braking. The number of aircraft equipped with ABS has been increasing continuously over the years and ABS is now accepted as an essential contribution to aircraft safety. The methods of control utilized by ABS are responsible for improved system performance, and improving ABS capability is a goal of aircraft manufacturers.

Electronic control units (ECUs), wheel speed sensors, and brake modulators are major components of an ABS module.

Wheel speed sensors transmit pulses to the ECU with a frequency proportional to wheel speed. The ECU then processes this information and regulates the brake accordingly. The ECU and a control algorithm are partially responsible for how well the ABS system performs which may implement a fuzzy logic control algorithm for use in an ABS system.

Since ABS systems are nonlinear and dynamic in nature they are a prime candidate for fuzzy logic control. For most runway surfaces, as a braking force is applied to the wheel system of the aircraft, the longitudinal relationship of friction between aircraft and runway surface rapidly increases. Wheel slip under these conditions is largely considered to be the difference between vehicle velocity and a reduction of wheel velocity during the application of braking force. Brakes work because friction acts against slip. The more slip given enough friction, the more braking force is brought to bear on the aircrafts momentum. Unfortunately, slip can and will work against itself during a RTO or on wet or icy surfaces where the coefficient of surface friction varies. If braking force continues to be applied beyond the runway surface's useful coefficient of friction, the brake effectively begins to operate in a non-friction environment. Increasing brake force in a decreasing frictional environment often results in full wheel lockup. It has been both mathematically and empirically proven a sliding wheel produces less friction than the rolling friction of a moving wheel.

ABS control algorithms should account for non-linearity in brake torque due to temperature variation and dynamics of the magnetic flux field interactions. Also, external disturbances such as changes in frictional coefficient and runway surface should be accounted for, not to mention the influences of tire wear and system components aging. These influential factors increase system complexity, in turn effecting mathematical models used to describe systems. As the model becomes increasingly complex equations required to control ABS also become increasingly complicated. Due to the highly dynamic nature of ABS many assumptions and initial conditions are used to make control achievable. Once control is achieved the system is implemented in prototype demonstration setups and tested. The system is then modified to attain the desired control status as defined by the test setup.

Due to the nature of fuzzy logic, influential dynamic factors are accounted for in a rule-based description of ABS. This type of "intelligent" control allows for faster development of system code. A recent article entitled "Fuzzy Logic Anti-Lock Brake System for a Limited Range Coefficient of Friction Surface," 1993 IEEE, addresses some of the issues associated with initial development of fuzzy ABS from the perspective of a system manufacturer.

Figure 3:
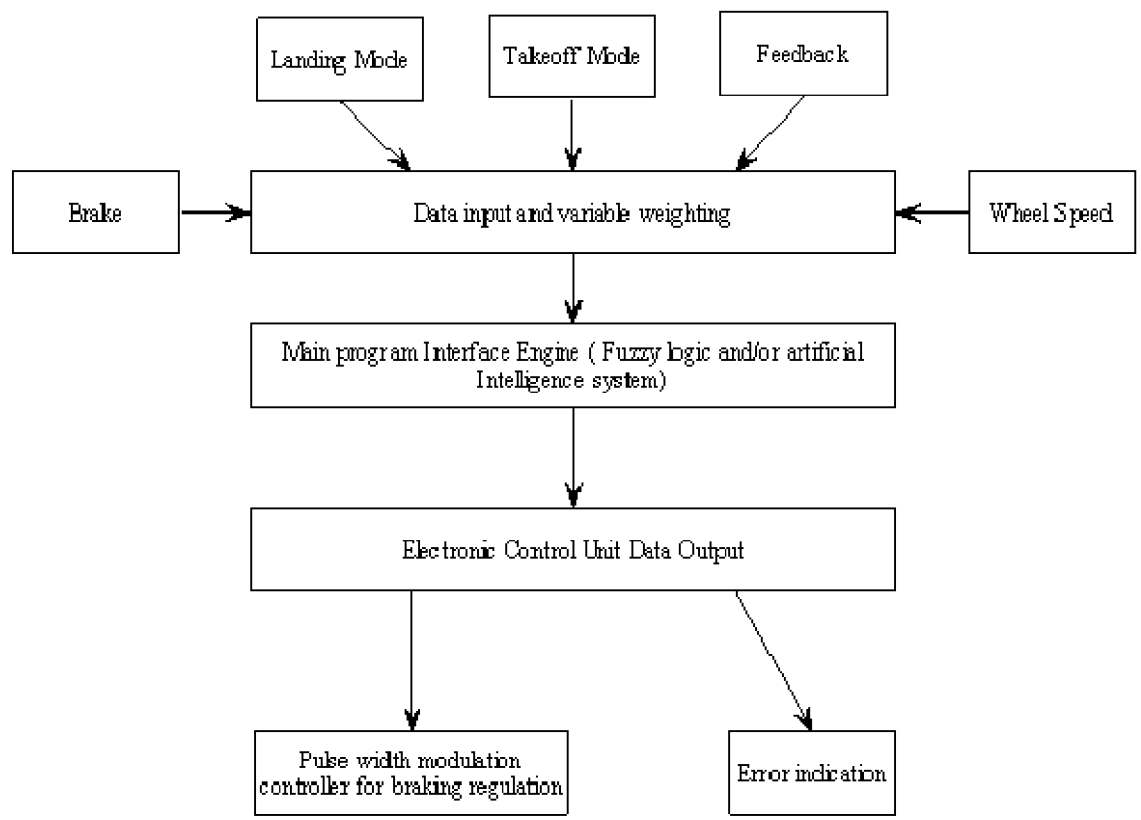
FIG. 3 is a block diagram illustrating a method and apparatus for fuzzy logic ABS control in accordance with the invention.

FIG. 3 is a block diagram illustrating a method and apparatus for fuzzy logic ABS control in accordance with the invention. The Inputs to the Fuzzy logic ABS are represented in FIG. 3 and consist of:

1. The Brake: This block represents the brake pedal deflection/assertion. This information is acquired in a digital or analog format and also indicates the position of the parking brake.

2. The landing mode: This indicates if the aircraft is in the landing mode can also program in specific runway data as data input to system.

3. The take-off: This input registers if the aircraft is prepared for take-off, and if the engine is running or not.

4. Feed-back: This block represents the set of inputs concerning the state of the ABS system such as temperature, electrical current levels generated and or applied to the wheel hub motor/generators among others.

5. Wheel speed: In a typical application this will represent a set of 4 input signals from each wheel hub motor/generator within each main landing gear assembly that convey the information concerning the speed of each wheel. This information is used to derive all necessary information for the control algorithm 6. Data Input and viable weighting allows for various input data to be combined and assessed as to validity and proper weighting before begin sent onto the ABS control algorithms installed within the Main program Interface Engine.

7. The Main program Interface Engine can be updated as such improvements are made available to process the input data for use by the Electronic Control Unit that outputs data to the indicators for the pilot such as a possible error signal and the Pulse Width Modulation Controller that controls the power applied to the wheel hub motor/generators of the braking system.

Acceleration and slip for each wheel may be calculated by combining the signals from each wheel. These signals are then processed in the Fuzzy logic ABS system to achieve the desired control and such architecture is such as to take advantage of improved math execution timing as such improvements are made available.

When Dynamic Braking is active wherein Dynamic Braking consist of using the wheel hub motor/generator as a generator and applying the output power to a resistor bank it may be setup such that the braking system releases the Automatic Braking System on the wheel hub motor/generators, since both braking systems could result in too much resistance and cause the wheels to slide thus causing flat areas on the tires of the wheels. Another variation would be Blended braking. Blended braking is used to make braking even more efficient. Created by feedback Electronics of the ABS, blended braking will use some Automatic Braking Systems while in the lower range of Dynamics and at the higher Amperage of the Dynamics use the less Automatic Braking if used. In full Dynamics the Automatic Brake could be such as to be completely released. Blended braking is tied into the wheel slip and other braking control circuits such as acceleration rates and velocity on the wheel hub motor/generator.

Although exemplary embodiments of this invention have been described, it in no way limits the scope within this invention. Those skilled in the art will readily appreciate that any modifications are possible and are to be included within the scope of this invention as defined in the following claims. In the claims, where means plus function clause are used, they are intended to cover the structural concepts described herein as performing the recited function and not only structural equivalents but also equivalent structures.

The method of the invention as described herein above in the context of the preferred embodiments is not to be taken as limited to all of the provided details thereof, since modifications and variations thereof may be made without departing from the spirit and scope of the invention. For example, the principles of the invention in their broader aspects may be applied to other motive and/or braking systems for electric vehicles such as trains, buses, trucks, cars, and boats or other electrically driven devices, which require braking.

What is claimed is:

1. An aircraft landing gear assembly for an aircraft, comprising:
  a nose gear and a main landing gear, at least one of the nose gear and the main landing gear comprising:
    one or more nonrotational base portions configured to connect to an airframe of the aircraft;

two or more wheels, wherein each of the two or more wheels is connected to and rotatable about a rotational axis with respect to one or more of the base portions;

at least one stator connected to each of the one or more base portions;

at least one rotor operably connected to each wheel and configured to rotate with respect to one or more of said stators;

wherein each of said at least one stator and said at least one rotor is configured to generate a magnetic flux; and wherein the landing gear assembly is configured for steering an aircraft while ground maneuvering or braking the aircraft or both, by converting electrical energy to rotational torque energy of the wheels, by driving the wheels, of a magnitude suitable to accomplish unassisted taxiing of the aircraft, at differential rates or in different directions or both by interaction of the magnetic fluxes of the at least one stator and at least one rotor;

wherein the landing gear assembly has at least two modes of motored operation: a first mode of motored operation, in which positive torque is applied to produce motor action in at least one of the two or more wheels in a first direction, and a second mode of motored operation, in which negative torque is applied to produce motor action in at least one of the two or more wheels in a direction opposite the first direction.

2. The aircraft landing gear assembly in accordance with claim 1, further comprising friction-type brakes connected to one of the base portions and configured to brake one of the connected wheels relative to the base portion in a blended braking system wherein magnetic braking is blended with conventional friction-type disk brakes.

3. The aircraft landing gear assembly in accordance with claim 1, wherein said at least one stator and said at least one rotor are configured so that interaction of their magnetic fluxes causes: converting electrical energy to rotational torque energy of the wheel of a magnitude suitable for use for unassisted ground maneuvering, and converting rotational torque energy of the wheel to electrical energy of a magnitude suitable for braking an aircraft.

4. The aircraft landing gear assembly in accordance with claim 1, wherein said at least one stator and said at least one rotor comprise conducting wire within carbon material configured so that interaction of their axial magnetic fluxes causes: converting electrical energy to rotational torque energy of the wheel, and converting rotational torque energy of the wheel to electrical energy.

5. The aircraft landing gear assembly in accordance with claim 4, wherein said conducting wire comprises a high temperature superconducting wire.

6. The aircraft landing gear assembly in accordance with claim 1, wherein said at least one stator comprises high energy density permanent magnets within carbon material and said at least one rotor comprises conducting wire within carbon material configured so that interaction of their axial magnetic fluxes causes: converting electrical energy to rotational torque energy of the wheel, and converting rotational torque energy of the wheel to electrical energy.

7. The aircraft landing gear assembly in accordance with claim 6, wherein said conducting wire comprises a high temperature superconducting wire.

8. The aircraft landing gear assembly in accordance with claim 1, wherein said at least one stator and said at least one rotor are configured so that interaction of their axial magnetic fluxes causes converting substantially all of the wheel's rotational torque energy into electrical energy and then into heat energy by the formation of eddy currents.

9. The aircraft landing gear assembly in accordance with claim 1, wherein said at least one rotor comprises high energy density permanent magnets and said stator comprises electrically conductive material, configured so that magnetic fluxes of the permanent magnets cause eddy currents to be generated within a stator to cause a magnetic drag torque energy to be generated within the wheel to dissipate the rotational energy of the wheel.

10. The aircraft landing gear assembly in accordance with claim 9, wherein the at least one rotor comprises conducting wire and the at least one stator comprises a solid conducting material conducive to generation of eddy currents when power is applied to said wire.

11. The aircraft landing gear assembly in accordance with claim 9, wherein the at least one stator comprises conducting wire and the at least one rotor comprises a solid conducting material conducive to generation of eddy currents when power is applied to said wire.

12. The aircraft landing gear assembly in accordance with claim 1, wherein said two or more wheels are connected to and independently rotatable with respect to one of the base portions about the rotational axis, wherein each of the two wheels is associated with a portion of the at least one stator and a portion of the at least one rotor.

13. The aircraft landing gear assembly in accordance with claim 1, wherein said at least one stator comprises electrically conductive wires and is configured to generate a first magnetic flux substantially parallel to said axis when current passes through said wires, wherein said at least one rotor comprises a permanent magnet configured to generate a second magnetic flux substantially parallel to said axis, and wherein the landing gear is configured to cause the wheel to rotate when said current passes through said wires by a magnetic torque interaction of the first and second magnetic fluxes.

14. The aircraft landing gear assembly in accordance with claim 1, wherein said stator comprises electrically conductive wires and is configured to generate a first magnetic flux substantially parallel to said axis when current passes through said wires, wherein said at least one rotor comprises a permanent magnet configured to generate a second magnetic flux substantially parallel to said axis, and wherein the landing gear is configured to cause the wheel to rotate when said current passes through said wires by a magnetic torque interaction of the first and second magnetic fluxes.

15. The aircraft landing gear assembly in accordance with claim 1, wherein said at least one rotor comprises electrically conductive wires and is configured to generate a first magnetic flux substantially parallel to said axis when current passes through said wires, wherein said at least one stator comprises a permanent magnet configured to generate a second magnetic flux substantially parallel to said rotational axis, and wherein the landing gear is configured to cause the wheel to rotate when said current passes through said wires by a magnetic torque interaction of the first and second magnetic fluxes.

16. The aircraft landing gear assembly in accordance with claim 1, wherein said at least one rotor comprises electrically conductive wires and is configured to generate a first magnetic flux substantially parallel to said axis when current passes through said wires, wherein said at least one rotor comprises a permanent magnet configured to generate a second magnetic flux substantially parallel to said axis, and wherein the landing gear is configured to cause the wheel to rotate when said current passes through said wires by a magnetic torque interaction of the first and second magnetic fluxes.

17. The aircraft landing gear assembly in accordance with claim 1, wherein said at least one rotor and said at least one stator comprise a plurality of stators and a plurality of rotors configured in a plurality of stator-rotor sets, each set comprising at least one stator and at least one rotor.

18. The aircraft landing gear assembly in accordance with claim 17, wherein, in each of said stator-rotor sets, at least one of said at least one stator and at least one rotor comprises electrically conductive wires configured to generate a magnetic flux substantially parallel to said axis when current passes through said wires, wherein each of said stator-rotor sets is independently operable as at least one of a motor and a generator depending on a voltage applied across said wires.

19. The aircraft landing gear assembly in accordance with claim 1, wherein at least one rotor is supplied with direct current such that a permanent magnet of the rotor applies a static nonrotational clamping force to a corresponding stator so as to provide a parking brake function.

20. The aircraft landing gear assembly in accordance with claim 1, wherein the landing gear assembly is further configured for braking the aircraft by converting rotational torque energy of the wheel to electrical energy by interaction of the magnetic fluxes of the at least one stator and at least one rotor.

21. The aircraft landing gear assembly in accordance with claim 1, wherein the two or more wheels are in the nose gear.

22. The aircraft landing gear assembly in accordance with claim 1, wherein the two or more wheels are in the main landing gear.

23. An aircraft, comprising an aircraft landing gear assembly in accordance with claim 1.

24. The aircraft landing gear assembly of claim 1, wherein at least one of the at least one stator and at least one rotor comprises high energy density permanent magnets.

25. The aircraft landing gear assembly of claim 1, wherein the at least one stator and at least one rotor are positioned within said two or more wheels of the aircraft landing gear assembly.

26. An aircraft landing gear assembly for an aircraft, comprising:
a nose gear and a main landing gear, at least one of the nose gear and the main landing gear comprising:
one or more nonrotational base portions configured to connect to an airframe of the aircraft;
two or more wheels, wherein each of the two or more wheels is connected to and rotatable about a rotational axis with respect to one or more of the base portions;
at least one stator connected to each of the one or more base portions;
at least one rotor operably connected to each wheel and configured to rotate with respect to one or more of said stators;
wherein each of said at least one stator and said at least one rotor is configured to generate a magnetic flux;
wherein said at least one rotor and said at least one stator comprise a plurality of stators and a plurality of rotors configured in a plurality of stator-rotor sets, each set comprising at least one stator and at least one rotor;
a processor connected to said stator-rotor sets; and
an electrical device comprising at least one of an electrical energy storage device and an electrical energy dissipation device;
wherein the landing gear assembly is configured for steering an aircraft while ground maneuvering or braking the aircraft or both by converting electrical energy to rotational torque energy of the wheels, by driving the wheels, of a magnitude suitable for unassisted taxiing of the aircraft, at differential rates or in different directions or both by interaction of the magnetic fluxes of the at least one stator and at least one rotor;
wherein the processor is configured to connect and disconnect the stator-rotor sets to and from each other and to and from the electrical device.

27. The aircraft landing gear assembly in accordance with claim 26, wherein the electrical device comprises a battery.

28. The aircraft landing gear assembly in accordance with claim 26, wherein the electrical device comprises a capacitor.

29. The aircraft landing gear assembly in accordance with claim 26, wherein the electrical device comprises a variable capacitor.

30. The aircraft landing gear assembly in accordance with claim 26, wherein the electrical device comprises a resistor configured for the dissipation of electrical power into heat energy in a location that such heat dissipation is safely controlled.

31. The aircraft landing gear assembly in accordance with claim 26, wherein the electrical device comprises at least one of a variable resistor and a resistor bank.

32. The aircraft landing gear assembly in accordance with claim 26, wherein, during a landing operation of the aircraft, the processor is configured to cause the wheel to rotate at a tangential velocity that substantially corresponds to a linear velocity of the aircraft.

33. The aircraft landing gear assembly in accordance with claim 32, wherein the electrical device comprises the electrical energy storage device, and wherein the processor is configured, after a touchdown of the aircraft, to connect at least one of said stator-rotor sets to said electrical energy storage device with a polarity that opposes a rotational direction of said wheel to thereby apply a motorized braking to the aircraft.

34. The aircraft landing gear assembly in accordance with claim 32, wherein the processor is configured to cause the wheel to rotate at a tangential velocity of between approximately 100 and 180 miles per hour.

35. The aircraft landing gear assembly in accordance with claim 26, wherein, during a landing operation of the aircraft, the processor is configured to cause the wheel to rotate to gyroscopically stabilize the aircraft.

36. The aircraft landing gear assembly in accordance with claim 26, wherein the processor is configured to connect at least one of the stator-rotor sets to the electrical device during a landing operation of the aircraft to thereby convert rotational energy of the wheel to electrical energy that is transferred to the electrical device.

37. The aircraft landing gear assembly in accordance with claim 36, wherein the processor comprises an anti-lock braking system.

38. The aircraft landing gear assembly in accordance with claim 37, wherein the anti-lock braking system comprises software that utilizes fuzzy logic.

39. The aircraft landing gear assembly in accordance with claim 26, wherein the processor is configured to connect a first of the stator-rotor sets to a second of the stator-rotor sets to apply electrical energy generated by the first of the stator-rotor sets to the second of the stator-rotor sets to thereby apply a motorized braking to the aircraft.

40. The aircraft landing gear assembly in accordance with claim 26, wherein the electrical device comprises the electrical energy storage device, and wherein the processor is configured to connect at least one of the stator-rotor sets to the electrical energy storage device during a take-off operation of the aircraft to thereby convert electrical energy stored in the electrical energy storage device to rotational energy of the wheel, and to connect at least one of the stator-rotor sets to the electrical energy storage device during a landing operation of the aircraft to thereby convert rotational energy of the wheel to electrical energy of the electrical energy storage device.

41. The aircraft landing gear assembly in accordance with claim 26, wherein the electrical device is external to the aircraft and configured to be connected to a runway for the aircraft, and wherein the aircraft is readily detachable from the electrical device.

42. The aircraft landing gear assembly in accordance with claim 41, wherein the electrical device is electrically connectable to the stator-rotor sets via direct electrical contact.

43. The aircraft landing gear assembly in accordance with claim 41, wherein the electrical device is electrically connectable to the stator-rotor sets without direct electrical contact by means of electrical induction for the transfer of electrical power.

44. The aircraft landing gear assembly in accordance with claim 41, wherein the processor is external to the aircraft and connected to the electrical device.

45. The aircraft landing gear assembly in accordance with claim 41, further comprising external controls that are wirelessly connected to the processor such that an air traffic controller may direct and maneuver said aircraft.

46. The aircraft landing gear assembly in accordance with claim 26, wherein the processor is configured to connect the stator-rotor sets to each other in series.

47. The aircraft landing gear assembly in accordance with claim 26, wherein the processor is configured to connect the stator-rotor sets to each other in parallel.

48. The aircraft landing gear assembly in accordance with claim 26, wherein the electrical device comprises the electrical energy storage device, wherein the processor is configured to variably adjust a voltage applied by the electrical energy storage device to at least one of the stator-rotor sets.

49. The aircraft landing gear assembly in accordance with claim 26, further comprising a weight input connected to the processor, wherein the processor is configured to connect and disconnect the stator-rotor sets to and from each other and to and from the electrical device based at least in part on weight information of the aircraft received via the weight input.

50. The aircraft landing gear assembly in accordance with claim 49, wherein the weighting for the processor is unique to each airport runway with the ability to adjust for various weather conditions and the ability to adjust the weighting over time as the system learns.

51. The landing gear assembly in accordance with claim 49, wherein the processor includes means for receiving an optimal braking torque curve for a particular runway with consideration as to weather conditions, whereby braking control can be tailored for said runway.

52. The aircraft landing gear assembly in accordance with claim 26, wherein the aircraft landing gear assembly comprises two wheels connected to and independently rotatable with respect to the nonrotational base portion about the rotational axis, wherein each of the two wheels is associated with a portion of the plurality of stators and a portion of the plurality of rotors, wherein the aircraft landing gear assembly further comprises a user input connected to the processor, and wherein the processor is configured to cause a first of said two wheels to rotate in one direction and a second of said two wheels to rotate in an opposite direction based at least in part on a turn instruction received via the user input.

53. The aircraft landing gear assembly in accordance with claim 26, wherein the aircraft landing gear assembly comprises two wheels connected to and independently rotatable with respect to the nonrotational base portion about the rotational axis, wherein each of the two wheels is associated with a portion of the plurality of stators and a portion of the plurality of rotors, wherein the aircraft landing gear assembly further comprises a user input connected to the processor, and wherein the processor is configured to cause a first of said two wheels to rotate in a direction at a first velocity and a second of said two wheels to rotate in said direction at a second velocity different from said first velocity based at least in part on a turn instruction received via the user input.

54. An aircraft landing gear assembly for an aircraft, comprising:
a nose gear and a main landing gear, at least one of the nose gear and the main landing gear comprising:
one or more nonrotational base portions configured to connect to an airframe of the aircraft;
two or more wheels, wherein each of the two or more wheels is connected to and rotatable about a rotational axis with respect to one or more of the base portions;
at least one stator connected to each of the one or more base portions;
at least one rotor operably connected to each wheel and configured to rotate with respect to one or more of said stators;
wherein each of said at least one stator and said at least one rotor is configured to generate a magnetic flux; and
wherein the landing gear assembly is configured for steering an aircraft while ground maneuvering or braking the aircraft or both by converting electrical energy to rotational torque energy of the wheels, by driving the wheels, of a magnitude suitable for unassisted taxiing of the aircraft, at differential rates or in different directions or both by interaction of the magnetic fluxes of the at least one stator and at least one rotor, wherein said at least one rotor comprises a rotor disk configured to move parallel to the rotational axis, and wherein a permanent magnet of said rotor disk applies a clamping force to a corresponding stator disk so as to provide a parking brake function.

55. The aircraft landing gear assembly in accordance with claim 54, wherein physical contacting surfaces of the at least one rotor disk and corresponding stator disk comprise carbon material, and wherein the permanent magnet of the rotor disk is recessed within said carbon material.

56. The aircraft landing gear assembly in accordance with claim 54, wherein such parallel movement of the rotor disk is accomplished by an electromagnetic piston type movement.

57. An aircraft landing gear assembly for an aircraft, comprising:
a nose gear and a main landing gear, at least one of the nose gear and the main landing gear comprising:
one or more nonrotational base portions configured to connect to an airframe of the aircraft;
two or more wheels, wherein each of the two or more wheels is connected to and rotatable about a rotational axis with respect to one or more of the base portions;
at least one stator connected to each of the one or more base portions;
at least one rotor operably connected to each wheel and configured to rotate with respect to one or more of said stators;
wherein each of said at least one stator and said at least one rotor is configured to generate a magnetic flux;
wherein the landing gear assembly is configured for steering an aircraft while ground maneuvering or braking the aircraft or both by converting electrical energy to rotational torque energy of the wheels, by driving the wheels, of a magnitude suitable for unassisted taxiing of the aircraft, at differential rates or in different directions or both by interaction of the magnetic fluxes of the at least one stator and at least one rotor;

a processor connected to said at least one stator and said at least one rotor; and an electrical device comprising at least one of an electrical energy storage device and an electrical energy dissipation device, wherein the processor is configured to connect and disconnect one or more of the at least one stator and at least one rotor to and from the electrical device.

* * * * *